United States Patent [19]

Yanagihara

[11] 4,180,021
[45] Dec. 25, 1979

[54] METHOD OF INJECTING FUEL AND A FUEL INJECTION DEVICE OF AN INTERNAL COMBUSTION ENGINE

[75] Inventor: Hiromichi Yanagihara, Susono, Japan

[73] Assignee: Toyota Jidosha Kogyo Kabushiki Kaisha, Toyota, Japan

[21] Appl. No.: 799,098

[22] Filed: May 20, 1977

[30] Foreign Application Priority Data

Mar. 28, 1977 [JP] Japan ................................. 52-33309

[51] Int. Cl.² ........................... F02B 19/10; F02F 3/28
[52] U.S. Cl. ............................... 123/32 ST; 123/30 D; 123/139 AR; 123/191 S; 417/499
[58] Field of Search ............... 123/30 C, 30 D, 32 C, 123/32 K, 32 L, 32 SP, 32 ST, 33 D, 191 S, 191 SP, 139 AR, 139 AE, 139 AD, 139 AA, 139 R; 417/494, 499

[56] References Cited

U.S. PATENT DOCUMENTS

| 2,019,650 | 11/1935 | Bischof | 123/139 AE |
|---|---|---|---|
| 2,315,907 | 4/1943 | Starr | 123/139 R X |
| 2,356,511 | 8/1944 | Descourts | 123/139 AR |
| 2,612,884 | 10/1952 | Reggio | 123/139 R |
| 2,615,437 | 10/1952 | Broderson | 123/32 SP |
| 2,690,741 | 10/1954 | Broderson | 123/32 SP |
| 4,013,055 | 3/1977 | Sommer | 417/494 X |

FOREIGN PATENT DOCUMENTS 2336932 2/1974 Fed. Rep. of Germany ... 123/139 AR
986326 7/1951 France ................................. 123/30 D Primary Examiner—Charles J. Myhre
Assistant Examiner—Tony M. Argenbright
Attorney, Agent, or Firm—Stevens, Davis, Miller & Mosher

[57] ABSTRACT

Disclosed are a method of injecting fuel and a fuel injection device in an internal combustion engine comprising a main chamber and an auxiliary chamber. An annular raised portion is formed on the inner wall of the auxiliary chamber and divides the auxiliary chamber into a first auxiliary chamber and a second auxiliary chamber. A connecting passage communicating the main chamber and the auxiliary chamber opens into the second auxiliary chamber tangentially to the inner wall of the second auxiliary chamber. A recess is formed in the second auxiliary chamber beneath the annular raised portion at a position located opposite to the inner wall to which the connecting passage is tangentially connected with respect to the axis of the auxiliary chamber. The nozzle of the fuel injector is directed to the recess so as to form a rich air-fuel mixture in the recess. The spark gap of the spark plug is located in the vicinity of the recess for igniting the rich air-fuel mixture formed in the recess. When the engine is operating under a heavy load, the fuel injection start timing is set at a constant timing, while, when the engine is operating under a light load, the fuel injection complete timing is set at a constant timing.

3 Claims, 9 Drawing Figures

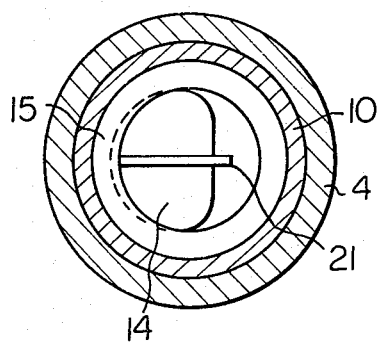
Fig. 2
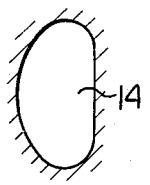
Fig. 3
Fig. 4
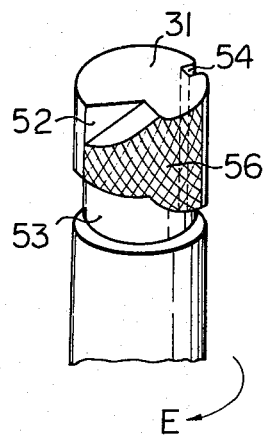
Fig. 5
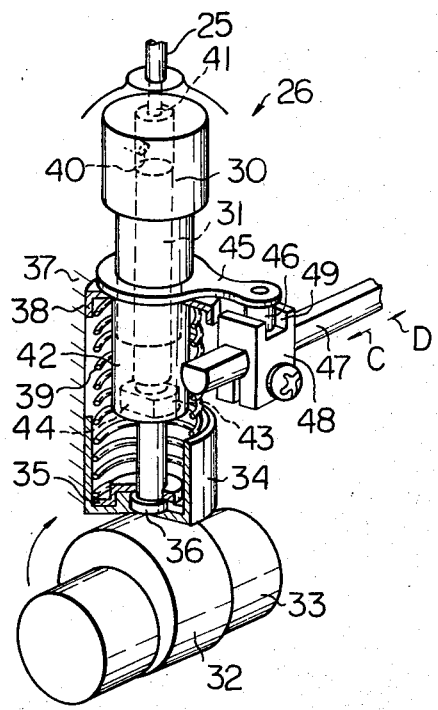

METHOD OF INJECTING FUEL AND A FUEL INJECTION DEVICE OF AN INTERNAL COMBUSTION ENGINE

DESCRIPTION OF A PREFERRED EMBODIMENT

The present invention relates to a method of injecting fuel and a fuel injection device in an internal combustion engine with an auxiliary chamber.

An internal combustion engine has been proposed wherein it is provided with an auxiliary chamber connected to a main chamber via a connecting passage. The auxiliary chamber comprises a first auxiliary chamber located at a position remote from the main chamber, and a second auxiliary chamber having a recess formed on the inner wall of the auxiliary chamber. The connecting passage is tangentially connected to the inner wall of the second auxiliary chamber arranged at a position near the main combustion chamber. The above-mentioned recess is formed on the inner wall of the second auxiliary chamber at a position opposite to the inner wall to which the connecting passage is tangentially connected with respect to the axis of the auxiliary chamber. The spark gap of a spark plug is located in the vicinity of the recess, and a fuel injector is disposed in the auxiliary chamber so that a combustible mixture can be formed in the recess.

In this engine, at the time of the intake stroke, a suction gas such as an air mixture or an air-fuel mixture, or a suction gas containing recirculated exhaust gas therein is introduced into the main chamber. Then, at the time of the compression stroke, the suction gas is forced into the auxiliary chamber via the connecting passage. At this time, since the connecting passage is arranged to be tangentially connected to the inner wall of the second auxiliary chamber, the suction gas causes a swirl motion in the auxiliary chamber. Then, fuel is injected from the fuel injector towards the recess, and a rich air-fuel mixture thus formed in the recess is ignited by the spark plug. After this, a lean air-fuel mixture formed in the first auxiliary chamber is ignited by the flame which propagates into the first auxiliary chamber.

As is mentioned above, in an internal combustion engine of this type, a rich air-fuel mixture is formed in the recess of the second auxiliary chamber; then, the rich air-fuel mixture thus formed is ignited by the spark plug. However, in an internal combustion engine of the above-mentioned type, since the regulating of the load of the engine is carried out by regulating the amount of fuel injected from the fuel injector, the amount of fuel injected from the fuel injector is increased as the level of the load of the engine is increased. Consequently, the combustible mixture formed in the recess of the second auxiliary chamber becomes richer as the level of the load of the engine is increased. As a result, carbon adheres onto the electrode of the spark plug when the engine is operating under a heavy load. As a result of this, since the discharging electric current leaks through the carbon to ground, it is impossible to supply a rich air-fuel mixture with a satisfactory ignition energy. Therefore, a good combustion cannot be obtained, thus causing the reduction of the torque, which in turn results in the problem wherein the engine cannot be operated.

An object of the present invention is to provide an internal combustion engine provided with an auxiliary chamber, which is capable of obtaining a high output power when the engine is operating under a heavy load.

According to the present invention, there is provided a method of injecting fuel into an internal combustion engine comprising a main chamber, an auxiliary chamber having an axis and consisting of a first chamber and a second chamber, a connecting passage communicating the second chamber with the main chamber and being tangentially connected to an inner wall of the second chamber for creating a swirl motion of a suction gas in the auxiliary chamber at the time of the compression stroke, the second chamber having a recess at a position located opposite to the inner wall to which the connecting passage is tangentially connected with respect to the axis of the auxiliary chamber, a fuel injector disposed in the auxiliary chamber for creating a rich air-fuel mixture in the recess, and a spark plug having a spark gap located in the vicinity of the recess for igniting the rich air-fuel mixture, wherein the fuel injection start timing of the fuel injector is set at a constant timing when the level of the load of the engine is higher than a predetermined level, while the fuel injection completion timing is set at a constant level when the level of the load of the engine is lower than the predetermined level.

In addition, according to the present invention, there is provided a fuel injection device in an internal combustion engine comprising a main chamber, an auxiliary chamber having an axis and consisting of a first chamber and a second chamber, a connecting passage communicating the second chamber with the main chamber and being tangentially connected to an inner wall of the second chamber for creating a swirl motion of a suction gas in the auxiliary chamber at the time of the compression stroke, the second chamber having a recess at a position located opposite to the inner wall to which the connecting passage is tangentially connected with respect to the axis of the auxiliary chamber, a fuel injector disposed in the auxiliary chamber for creating a rich air-fuel mixture in the recess, and a spark plug having a spark gap located in the vicinity of the recess for igniting the rich air-fuel mixture, the fuel injection device comprising a housing having a cylinder bore; a plunger reciprocally movable in the cylinder bore and having a pair of grooves extending along a circumferential wall of the plunger and spaced with each other for forming an inner circumferential wall for the plunger operation having a predetermined shape between the grooves; a fuel feed port opening into the cylinder bore and arranged to cooperate with the inner circumferential wall for the plunger operation when the plunger moves upwards; a fuel delivery port opening into the cylinder bore and connected to the fuel injector, and a plunger actuating means for rotating the plunger about its axis in accordance with the level of the load of the engine, the inner circumferential wall for the plunger operation closing the fuel feed port for starting the injecting operation when the plunger moves upwards from a lowermost position thereof to reach a predetermined first position and when the level of the load of the engine is higher than a predetermined level, while the inner circumferential wall for the plunger operation opens the fuel feed port for stopping the injecting operation when the plunger moves upwards from the lowermost position to reach a predetermined second position which is higher than the predetermined first position and when the level of the load of the engine is lower than the predetermined level.

The present invention may be more fully understood from the following description of a preferred embodiment of the invention, together with the accompanying drawings.

BRIEF DESCRIPTION OF THE DRAWINGS

In the drawings:

FIG. 2 is a cross-sectional view taken along the line II—II in FIG. 1;

FIG. 3 is a cross-sectional view taken along the line III—III in FIG. 1;

FIG. 4 is a perspective view of a plunger;

FIG. 5 is a schematic view of a fuel injection pump;

DESCRIPTION OF A PREFERRED EMBODIMENT

Figure 1:
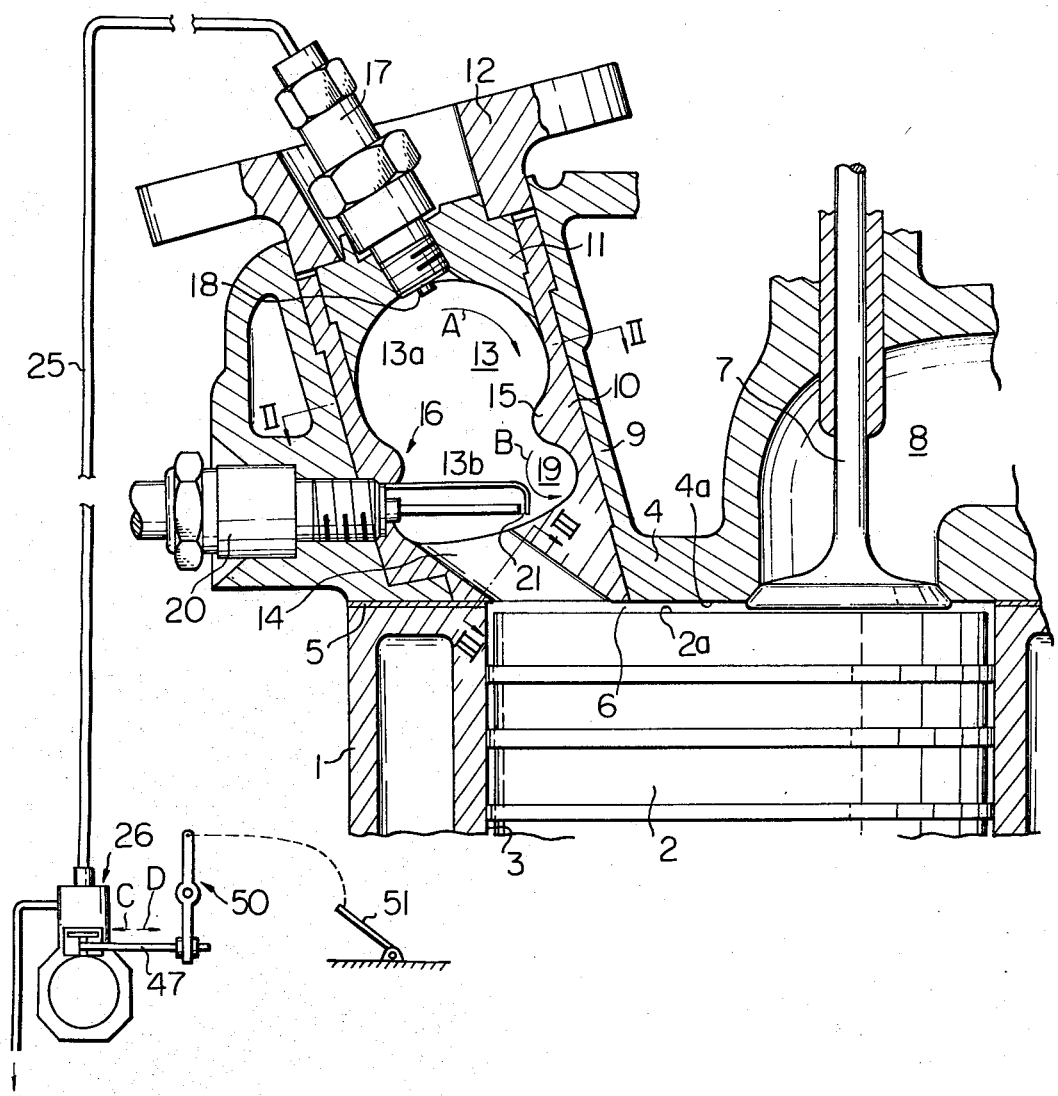
FIG. 1 is a cross-sectional side view of an internal combustion engine.

FIG. 1 shows the case wherein the present invention is applied to an internal combustion engine provided with a large size auxiliary chamber.

Referring to FIG. 1, 1 designates a cylinder block, 2 a piston reciprocally movable in a cylinder bore 3 and having a flat top surface 2a, 4 a cylinder head fixed onto the cylinder block 1 via a gasket 5 and having a flat inner surface 4a, 6 a main chamber, 7 an intake valve, and 8 an intake port. An exhaust valve (not shown) is mounted on the cylinder head 4. A hole 9 having a circular cross-section is formed in the cylinder head 4, and an auxiliary chamber component 10 is fitted into the hole 9. In addition, another auxiliary chamber component 11 is fitted into the upper portion of the auxiliary chamber component 10. The auxiliary chamber components 10 and 11 are rigidly fixed onto the cylinder head 4 by means of a fixing plate 12 which is fixed onto the cylinder head 4 by means of bolts (not shown). An auxiliary chamber 13 is formed in the auxiliary chamber components 10 and 11 and is connected to the main chamber 6 via a connecting passage 14 formed in the auxiliary chamber component 10. In addition, the sum of the volumes of the auxiliary chamber 13 and the connecting passage 14 is selected so as to be more than 80 percent, of to the sum of the volumes of the auxiliary chamber 13, the connecting passage 14 and the main chamber 6 when the piston 2 is in the top dead center position as shown in FIG. 1.

The shape of the inner wall of the auxiliary chamber 13 is formed along a surface of revolution, that is, a symmetrical surface formed around the longitudinal axis of the auxiliary chamber 13. Thus, as is shown in FIG. 2, the cross-sectional shape of the auxiliary chamber 13 is circular. As is shown in FIG. 1, an annular raised portion 15 having a smoothly curved line in a longitudinal cross-section is formed on the inner wall of the auxiliary chamber component 10, and a restricted opening 16 having a circular cross-section is formed by the annular raised portion 15. However, it is not always necessary to form the restricted opening 16 in a circular cross-section, and the cross-sectional shape of the restricted opening 16 may be formed in an elliptical cross-section. The auxiliary chamber 13 is divided into the first auxiliary chamber 13a and the second auxiliary chamber 13b by the annular raised portion 15. In addition, the annular raised portion 15 is so arranged that the sum of the volumes of the second auxiliary chamber 13b and of the connecting passage 14 is less than 40 percent of the sum of the volumes of the auxiliary chamber 13 and the the connecting passage 14. The shape of the inner wall of the first auxiliary chamber 13a is formed in a spherical shape or in an approximate ellipsoidal shape. On the other hand, the shape of the inner wall of the second auxiliary chamber 13b is formed in an ellipsoid. The upper end of the connecting passage 14 is tangentially connected to the inner wall of the second auxiliary chamber 13b, while the lower end of the connecting passage 14 opens into the periphery of the main chamber 6. The nozzle 18 of the fuel injector 17 is arranged at the apex of the first auxiliary chamber 13a so as to be directed to a recess 19 which is formed on the inner wall of the second auxiliary chamber 13b beneath the annular raised portion 15 at a position located opposite to the inner wall to which the connecting passage 14 is tangentially connected with respect to the axis of the auxiliary chamber 13. The fuel injector 17 is connected to a fuel pump 26 via a conduit 25. In addition, the spark gap 21 of a spark plug 20 is located in the recess 19 in the vicinity of the opening of the connecting passage 14. Since the engine shown in FIG. 1 is provided with no throttle valve, the intake port 8 is directly connected to an air cleaner (not shown) or connected to the air cleaner via a carburetor (not shown) for forming a lean air-fuel mixture. Therefore, in this engine, the regulation of the load of the engine is carried out by regulating an amount of the fuel injected from the fuel injector 17. In addition, the exhaust gas may be recirculated into the intake port 8.

In operation, at the time of the intake stroke, a suction gas such as an air mixture or a lean air-fuel mixture, or a suction gas containing a recirculated exhaust gas therein is introduced into the main chamber 6 via the intake valve 7. Then, at the time of the compression stroke, the suction gas is forced into the auxiliary chamber 13 via the connecting passage 14. The suction gas forced into the auxiliary chamber 13 passes through the second auxiliary chamber 13b and then enters into the first auxiliary chamber 13a, thus causing a strong swirl motion as shown by the arrow A in the first auxiliary chamber 13a. On the other hand, a swirl motion as shown by the arrow B is caused in the recess 19 by the strong swirl motion A. As is hereinafter mentioned in detail, the injecting operation of the fuel injector 17 is started when the piston reaches an approximately bottom dead center at the beginning of the compression stroke. This injecting operation is completed at approximately 120 degrees before top dead center. A large part of the fuel injected towards the recess 19 reaches the recess 19, and a large part of the fuel which reaches the recess 19 remains in the recess 19. However, the remaining part of the fuel which reaches the recess 19 is introduced into the first auxiliary chamber 13a via the second auxiliary chamber 13b. Then, a part of the fuel introduced into the first auxiliary chamber 13a is again returned to the second auxiliary chamber 13b. As is stated previously, a swirl motion B is created in the recess 19. Therefore, the vaporization of the liquid fuel adhering onto the inner wall of the recess 19 is promoted by the swirl motion B and by the heat of the inner wall of the recess 19. As a result, a rich air-fuel mixture is formed in the recess 19. After this, the rich air-fuel mixture formed in the recess 19 is ignited by the spark plug 20. While a part of the flame of the rich air-fuel mixture thus ignited is injected into the main chamber 6 via the connecting passage 14, the remaining large part of the flame is propagated into the first auxiliary chamber 13a via the restricted opening 16. While an extremely lean air-fuel mixture is being formed in the first auxiliary chamber 13a when the engine is operating under a light load, the flame propagating into the first auxiliary chamber 13a swirls in the first auxiliary chamber 13a together with the strong swirl motion A. As a result, the combustible mixture in the first auxiliary chamber 13a is rapidly and almost completely burned.

Figure 9:
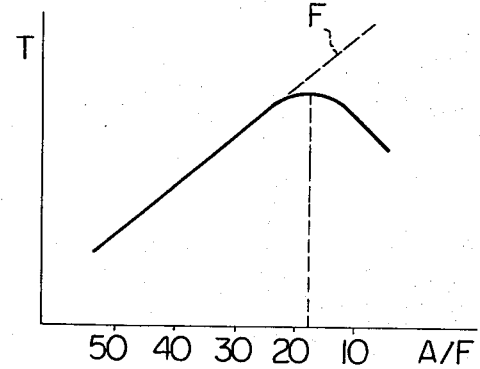
FIG. 9 is a graph showing the relationship between the torque and the mean value of an air-fuel ratio in the auxiliary chamber.

As is previously, in the engine shown in FIG. 1, the level of the load of the engine is regulated in accordance with an amount of the fuel injected from the fuel injector 17. This regulating operation is shown in FIG. 9. Accordingly, in FIG. 9, the ordinate indicates the torque (T) and the abscissa indicates the mean value of the air-fuel ratio (A/F) in the auxiliary chamber 13 (FIG. 1). As is shown in FIG. 9, the torque T is increased as the amount of the fuel injected from the fuel injector 17 is increased, that is, as the mean value of the air-fuel ratio A/F in the auxiliary chamber 13 is reduced. However, in a conventional engine, when the mean value of an air-fuel ratio A/F is reduced below approximately 18:1, carbon adheres onto the electrode of the spark plug 20. As a result, since a sufficient ignition energy cannot be supplied to a rich air-fuel mixture, the torque is reduced as shown by the curving solid line in FIG. 9.

FIG. 5 shows a perspective view of the fuel injection pump 26 shown in FIG. 1. Referring to FIG. 5, 30 designates a cylinder, 31 a plunger reciprocally movable in the cylinder 30, 32 a cam formed on a camshaft 33 driven by the engine (not shown), 34 a tappet always abutting upon the cam face of the cam 32, and 35 a retainer for holding an enlarged lower end portion 36 of the plunger 31 on the inner wall of the tappet 34. A compression spring 39 is disposed between the retainer 35 and a spring seat 38 fixed onto the housing 37 of the fuel injection pump 26 so that the tappet 34 is always abutting upon the cam face of the cam 32 due to the spring force of the compression spring 39. In addition, a fuel feed port 40 is arranged to open onto the circumferential inner wall of the cylinder 30, and a fuel delivery port 41 connected to the fuel conduit 25 is arranged to open onto the upper inner wall of the cylinder 30. When the camshaft 33 rotates, the plunger 31 moves upwards, and the fuel in the cylinder 30 is injected from the fuel injector 17 (FIG. 1) via the delivery port 41 and the conduit 25 after the fuel feed port 40 is closed by an inner circumferential wall for the plunger operation which is hereinafter described in detail. In addition, a pressure regulating valve (not shown), which is opened when the pressure of the fuel in the cylinder 30 is elevated beyond a predetermined level, is disposed in the fuel conduit 25 communicating the fuel delivery port 41 with the fuel injector 17. A control sleeve 42 rotatable around the axis of the plunger 31 is disposed in the housing 37 of the fuel injection pump 26. In the inside of the control sleeve 42, an enlarged portion 43 is formed in one piece on the plunger 31. This enlarged portion 43 has a pair of flat surfaces 44 which are arranged at positions opposite to each other with respect to the axis of the plunger 31. A pair of slide guide surfaces (not shown) extending in the axial direction of the control sleeve 42 is formed on the circumferential inner wall of the control sleeve 42 and arranged to be engaged with the flat surfaces 44 of the enlarged portion 43 so that the plunger 31 rotates together with the control sleeve 42. An arm 45 is formed in one piece on the upper end of the control sleeve 42, and a pin 46 is mounted on the tip of the arm 45. This pin 46 is fitted into a rectangular groove 49 of a member 48 fixed onto a control rod 47. As is shown in FIG. 1, the control rod 47 is connected to an acceleration foot pedal 51 via a link mechanism 50. When the acceleration foot pedal 51 is depressed, the control rod 47 moves in the direction shown by the arrow C in FIGS. 1 and 5. As a result, the amount of fuel injected from the fuel injector 17 is increased as in hereinafter described. On the other hand, when the acceleration foot pedal 51 is released from the depressing operation, the control rod 47 moves in the direction shown by the arrow D in FIGS. 1 and 5. As a result, the amount of fuel injected from the fuel injector 17 is reduced.

Figure 6:
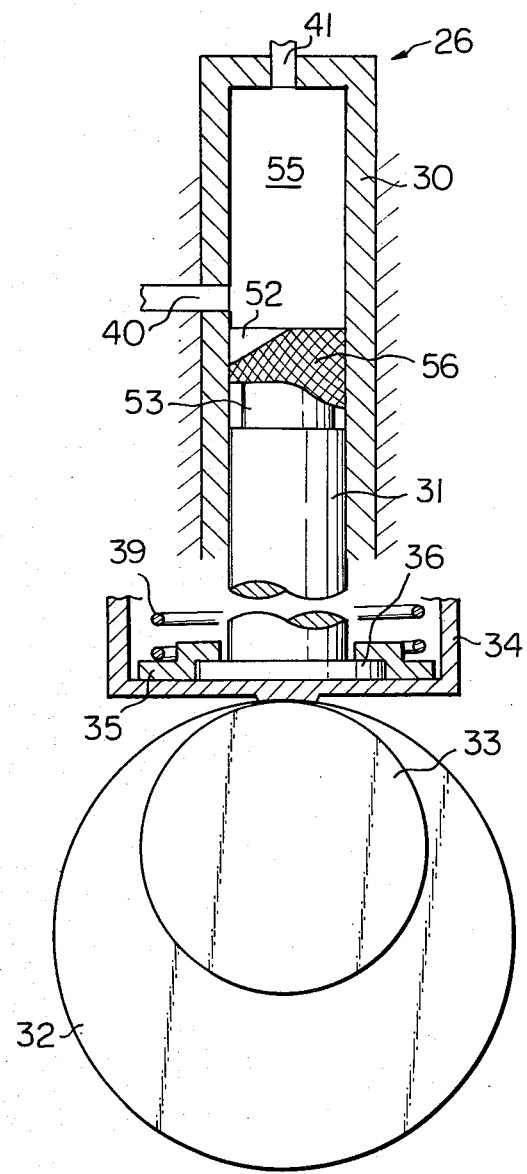
FIG. 6 is a cross-sectional side view of the fuel injection pump shown in FIG. 5.
Figure 8:
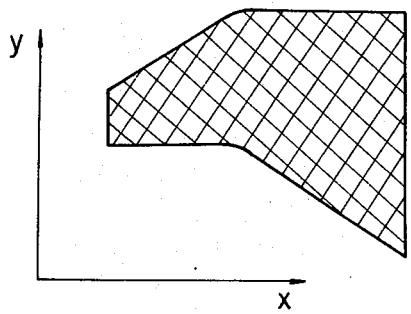
FIG. 8 is a two-dimensional view of spread-out inner circumferential wall for the plunger operation shown in FIG. 4.

FIG. 4 shows a perspective view of the plunger 31, and FIG. 6 shows an enlarged view of the plunger 31 and the cam 32. Referring to FIGS. 4 and 6, a pair of circumferential grooves 52 and 53 are formed on the upper end of the plunger 31. The circumferential groove 52 is so formed that its width is gradually increased along the circumferential direction E, as shown in FIG. 4. On the other hand, the circumferential groove 53 is so formed that its width is gradually increased in the first half thereof along the circumferential direction E, and is maintained uniform in the latter half thereof along the circumferential direction E. In addition, the circumferential groove 53 is connected to a cylindrical chamber 55 via a longitudinal groove 54 formed on the circumferential wall of the plunger 31. An inner circumferential wall for the plunger operation 56 having a width which is gradually reduced along the circumferential direction E is formed between the circumferential grooves 52 and 53. FIG. 8 shows a two-dimensional view of spread-out inner circumferential wall for the plunger operation 56. In FIG. 8, the x-axis indicates the circumferential direction of the plunger 31, and the y-axis indicates the axial direction of the plunger 31.

The camshaft 33 (FIG. 5) is connected to the crankshaft (not shown) of the engine so that the cam 32 rotates at a speed which is half of the rotating speed of the crankshaft. FIG. 6 shows the case wherein the piston is positioned in the top dead center at the start of the intake stroke and wherein the engine is operating under a light load, that is, in FIG. 1, wherein the control rod 47 moves towards the most righthand position. When the acceleration foot pedal is depressed, the control rod 47 moves in the direction C (FIG. 5) and, accordingly, the plunger 31 rotates in the direction E (FIG. 4).

In FIG. 6, when the cam 32 rotates, the plunger 31 moves upwards. During the time when the plunger 31 is moving upwards and the circumferential groove 52 is facing the fuel feed port 40, since the cylindrical chamber 55 is connected to the fuel feed port 40 via the circumferential groove 52, even if the plunger 31 moves upwards, the fuel in the cylindrical chamber 55 is returned to a fuel reservoir (not shown) via the fuel feed port 40. As a result of this, the fuel is not fed into the fuel injector 17 (FIG. 1). When the cam 32 rotates further and, accordingly, the plunger 31 moves further upwards, the fuel feed port 40 is closed by the inner circumferential wall for the plunger operation 56. Consequently, the pressure of the fuel in the cylindrical chamber 55 is elevated as the plunger 31 moves upwards. As a result, the fuel is injected from the fuel injector 17 (FIG. 1). When the cam 32 rotates further and, accordingly, the plunger 31 moves further upwards, since the circumferential groove 53 is facing the fuel feed port 40, the fuel in cylindrical chamber 55 is returned to the fuel reservoir (not shown) via the longitudinal groove 54 (FIG. 4), the circumferential groove 53 and the fuel feed port 40. As a result of this, the injecting operation of the fuel injector 17 (FIG. 1) is stopped.

Figure 7:
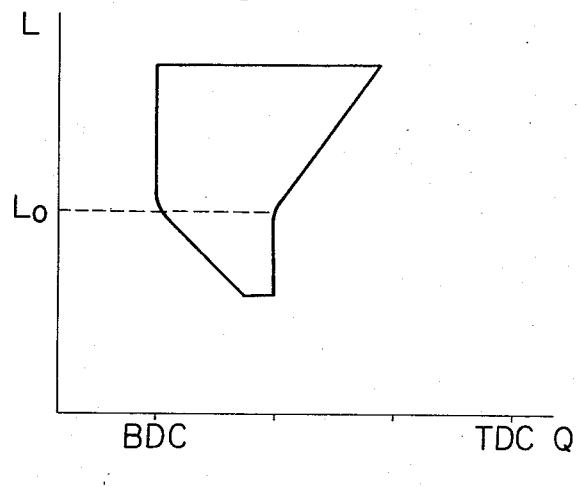
FIG. 7 is a graph showing the time length of the fuel injection.

As is understood from the above description, the injecting operation of the fuel injector 17 is carried out in the range of a crank angle in which the inner circumferential wall for the plunger operation 56 closes the fuel feed port 40. In addition, it is understood that the injecting operation of the fuel injector 17 is started immediately after the upper edge of the inner circumferential wall for the plunger operation 56 reaches the fuel feed port 40, and the injecting operation of the fuel injector 17 is stopped immediately after the lower edge of the inner circumferential wall for the plunger operation 56 reaches the fuel feed port 40. Consequently, since the inner circumferential wall for the plunger operation 56 has a surface profile as shown in FIG. 8 and, in addition, the plunger 31 rotates in the direction E in FIG. 4 as the level of the load of the engine is increased, it is understood that the injection complete timing at which the injecting operation of the fuel injector 17 is completed is constant when the level of the load of the engine is lower than a predetermined level, and the injection start timing at which the injecting operation of the fuel injector 17 is started is constant when the level of the load of the engine is higher than the predetermined level. In addition, it is understood that when the level of the load of the engine is lower than the predetermined level, the injection start timing is advanced as the level of the load of the engine is increased, and when the level of the load of the engine is higher than the predetermined level, the injection complete timing is retarded as the level of the load of the engine is increased. Consequently, the time period of the fuel injection is as shown in FIG. 7. Accordingly, in FIG. 7, the ordinate indicates a load L, and the abscissa indicates a crank angle Q. According to the experiments conducted by the inventor, as is shown in FIG. 7, it has been proven that it is preferable that the injection complete timing during the time when the level of the load of the engine is lower than the predetermined level Lo be set at approximately 120 degrees before top dead center, and that the injection start timing during the time when the level of the load of the engine is higher than the predetermined level Lo be set approximately bottom dead center. In addition, it is preferable that the level of the load at which a decrease in the torque T is started (see FIG. 9) be adopted as the above-mentioned load Lo.

In an internal combustion engine of the type as shown in FIG. 1, the velocity of the suction gas forced into the auxiliary chamber 13 via the connecting passage 14 at the time of the compression stroke is low before the piston is positioned at approximately 120 degrees before top dead center. Consequently, if the injection complete timing is set at approximately 120 degrees before top dead center, the fuel injected from the fuel injector 17 can surely reach the recess 19; as a result, a rich air-fuel mixture of an optimum air-fuel ratio is formed in the recess 19, while a lean air-fuel mixture of an optimum air-fuel mixture is formed in the first auxiliary chamber 13a. Contrary to this, when the engine is operating under a heavy load, a large amount of fuel is injected from the fuel injector 17. Consequently, at this time, if the injection complete timing is set at approximately 120 degrees before top dead center as in the case wherein the engine is operating under a light load, an extremely rich air-fuel mixture is formed in the recess 19. As a result of this, carbon adheres onto the electrode of the spark plug 20; thus, it is impossible to supply the rich air-fuel mixture with a satisfactory ignition energy. Therefore, a good combustion cannot be obtained, and the torque (T) is reduced as shown by the solid line in FIG. 9. However, the velocity of the suction gas forced into the auxiliary chamber 13 via the connecting passage 14 is high after the piston is positioned at approximately 120 degrees before top dead center. Consequently, if the injection start timing is maintained at a constant timing when the engine is operating under a heavy load as is shown in FIG. 7, the fuel injected from the fuel injector 17 after the piston is positioned at approximately 120 degrees before top dead center cannot reach the recess 19 and remains in the first auxiliary chamber 13a. Consequently, even if the engine is operating under a heavy load, a rich air-fuel mixture of an optimum air-fuel ratio is formed in the recess 19. On the other hand, as is mentioned above, since the fuel injected after the piston is positioned at approximately 120 degrees before top dead center remains in the first auxiliary chamber 13a, the mixture in the auxiliary chamber 13 has an approximately uniform air-fuel ratio over the entire space of the auxiliary chamber 13. As a result of this, the flame of the combustible mixture ignited by the spark plug 20 rapidly propagates into the first auxiliary chamber 13a. Thus, a high output power shown by the broken line F in FIG. 9 can be obtained when the engine is operating under a heavy load.

According to the present invention, even if the engine is operating under a heavy load, a reduction of the torque can be prevented, thus a high output power can be obtained.

While the invention has been described with reference to a specific embodiment chosen for purposes of illustration, it should be apparent that numerous modifications could be made thereto by those skilled in the art without departing from the spirit and scope of the invention.

What is claimed is:

1. A fuel injection device in an internal combustion engine comprising a main chamber, an auxiliary chamber having an axis and consisting of a first chamber and a second chamber, a connecting passage communicating said second chamber with said main chamber and being tangentially connected to an inner wall of said second chamber for creating a swirl motion of a suction gas in said auxiliary chamber at the time of the compression stroke, said second chamber having a recess at a position located opposite to said inner wall to which said connecting passage is tangentially connected with respect to the axis of said auxiliary chamber, a fuel injector in the end of said first chamber most remote from said second chamber for directing a rich air-fuel mixture toward said recess, and a spark plug having a spark gap located in the vicinity of said recess for igniting said rich air-fuel mixture, said fuel injection device comprising:

a housing having a cylinder bore;

a plunger reciprocally movable in said cylinder bore and having a pair of grooves extending along a circumferential wall of said plunger and spaced from each other for forming an inner circumferential wall for the plunger operation having a predetermined shape between said grooves;

a fuel feed port opening into said cylinder bore and arranged to cooperate with said inner circumferential wall for the plunger operation when said plunger moves upwards;

a fuel delivery port opening into said cylinder bore and connected to said fuel injector; and a plunger actuating means for rotating said plunger about its axis in accordance with the level of the load of said engine, said inner circumferential wall for the plunger operation closing said fuel feed port for starting the injecting operation when said plunger moves upwards from a lowermost position thereof to reach a predetermined first position and when said level of the load of said engine is higher than a predetermined level, while said inner circumferential wall for the plunger operations opens said fuel feed port for stopping said injecting operation when said plunger moves upwards from said lowermost position to reach a predetermined second position which is higher than said predetermined first position and when said level of the load of said engine is lower than said predetermined level.

2. A fuel injection device as claimed in claim 1 wherein said predetermined shape has a longitudinal width gradually increasing in the circumferential direction of said plunger, a substantially straight horizontally extending upper edge in the region in which said width is larger, and a substantially straight horizontally extending lower edge in the region in which said width is smaller.

3. In an internal combustion engine comprising a main combustion chamber, an auxiliary combustion chamber having an axis and comprising a first sub-combustion chamber and a second sub-combustion chamber, a connecting passage fluidly communicating said second chamber with said main chamber and being tangentially disposed relative to an inner wall of said second chamber for creating a swirl motion of intake gas in said auxiliary chamber at the time of the compression stroke, said second chamber having a recess at a position opposite said inner wall to which said connecting passage is tangentially connected with respect to the axis of said auxiliary chamber, a fuel injector in the end of said first sub-chamber most remote from said second sub-chamber for directing a rich air-fuel mixture into said recess, and a spark plug having a spark gap located in said second sub-chamber adjacent said recess for igniting the rich air-fuel mixture, a fuel injection device, said fuel injection device comprising:

a housing having a cylinder bore;

a plunger reciprocally movable in said cylinder bore and having a pair of grooves extending along a circumferential wall of said plunger and spaced from each other to define a circumferential wall for the plunger operation, said wall having a predetermined shape between said grooves, said predetermined shape having a longitudinal width which gradually increases in the circumferential direction of said plunger, a substantially straight horizontally extending upper edge and a substantially straight lower edge gradually decreasing in depth in the circumferential direction in the region in which said width is largest, and a substantially straight horizontally extending lower edge and a substantially straight upper edge gradually increasing in height in the circumferential direction in the region in which said width is smallest;

a fuel feed port opening into said cylinder bore and arranged to cooperate with said circumferential wall for the plunger operation when said plunger moves upwards;

a fuel delivery port opening into said cylinder bore and connected to said fuel injector; and a plunger actuating means for rotating said plunger about its axis in accordance with the level of the load of the engine, said circumferential wall for the plunger operation closing said fuel feed port for starting the fuel injecting operation when said plunger moves upwards from a lowermost position thereof to reach a predetermined first position and when the level of the load of said engine is higher than a predetermined level, while said circumferential wall for the plunger operation opens said fuel feed port for stopping the fuel injection operation when said plunger moves upwards from said lowermost position to reach a second predetermined position which is higher than said first predetermined position and when said level of the load of said engine is lower than said predetermined level.

* * * * *